United States Patent [19]

MacKelvie

[11] Patent Number: 5,055,751
[45] Date of Patent: Oct. 8, 1991

[54] BRUSHLESS MOTOR CONTROL SYSTEM

[76] Inventor: John S. MacKelvie, R.R. #3, Keene, Ontario, Canada, K0L 2G0

[21] Appl. No.: 469,790

[22] Filed: Jan. 24, 1990

[30] Foreign Application Priority Data

Jan. 24, 1989 [GB] United Kingdom ............. 8901475
Mar. 30, 1989 [GB] United Kingdom ............. 8907215

[51] Int. Cl.$^5$ ............................................. H02P 6/02
[52] U.S. Cl. ................................. 318/254; 318/138
[58] Field of Search ............... 318/138, 254, 293, 430, 318/432, 434, 439

[56] References Cited

U.S. PATENT DOCUMENTS

| 3,662,237 | 5/1972 | Favre | 318/138 X |
| 3,988,654 | 10/1976 | Takahashi et al. | 318/254 |
| 4,135,120 | 1/1979 | Hoshimi et al. | 318/254 X |
| 4,385,265 | 5/1983 | Uzuka | 318/254 X |
| 4,393,339 | 7/1983 | Kimura | 318/254 |
| 4,514,667 | 4/1985 | Sakmann et al. | 318/254 |
| 4,574,225 | 3/1986 | Pershall et al. | 318/138 X |
| 4,879,497 | 11/1989 | Meyer et al. | 318/254 |

FOREIGN PATENT DOCUMENTS

| 52-72412 | 6/1977 | Japan | 318/254 |
| 58-99300 | 6/1983 | Japan | 318/254 |
| 1092672 | 5/1984 | U.S.S.R. | 318/138 |
| 1382621 | 2/1975 | United Kingdom | 318/138 |

Primary Examiner—Bentsu Ro
Attorney, Agent, or Firm—Staas & Halsey

[57] ABSTRACT

In a brushless DC motor having a stator coil connected between a source of DC power voltage and circuit common and in which an alternating counter-emf exists, a circuit for converting stored inductive energy in the stator coil into useful motor mechanical energy, the circuit comprising first switch means connected in series between the stator coil and the circuit common for selectively switching current through the stator coil to circuit common during a positive torque producing half-cycle of the alternating counter-emf, thereby maintaining a predetermined average value of the current, and second switch means connected in series with a free-wheeling diode means across the stator coil for re-circulating the current through the stator coil when the first switch means is open and back-emf generated by the coil exceeds the counter-emf by an amount sufficient to forward-bias the diode means, whereby the current re-circulating through the stator coil results in positive torque while the first switch means is open.

24 Claims, 6 Drawing Sheets

BRUSHLESS MOTOR CONTROL SYSTEM

FIELD OF THE INVENTION

The present invention relates to magneto-electric machinery, and more particularly to a control circuit for brushless DC motor operation to convert electrical energy more efficiently into useful mechanical energy.

BACKGROUND OF THE INVENTION

Magneto-electric machines, including brushless DC motors and conventional DC permanent magnet motors, have been known for many years. A typical magneto-electric machine has phased windings in a stator and permanent magnets on a rotor. The two components are separated by an air gap so that rotation of the rotor may occur.

Brushless and conventional permanent magnet DC motors are described, for example, in U.S. Pat. No. 4,605,874 (Whiteley) as well as in the engineering handbook entitled "DC Motors, Speed Controls, Servo Systems" (fifth edition, 1980) published by Electrocraft Corporation, Hopkins, Minn., U.S.A., and reference may be made thereto to ascertain the current state of the art.

A brushless permanent magnet DC motor requires shaped and time current pulses in its windings in order to provide designed torque characteristics. The average torque is determined in part by the average value of the current pulse, which can be set by amplitude control, by time-ratio-control or a combination of both.

When it is advantageous to employ a half wave winding configuration, each winding carries current for a maximum of one half cycle of alternating counter-emf which arises in the winding due to the relative motion of the magnetic field and winding. Current flow in the other half cycle is not permitted because it contributes negative torque. Thus, prior art control circuits typically utilize a switch in series with each stator coil for alternately pulsing current through the associated coil.

For example, in time-ratio-control systems, energy efficient pulse shaping is effected by the use of fast acting switches in series with the current-carrying windings. However, when the switches are opened, the inductive energy stored in the windings must be decreased or eliminated.

The stored inductive energy may be removed when the switch opens, by absorption in the switch or in an overvoltage device such as a Zener diode, and is typically dissipated as heat.

It is also known from the prior art to utilize a free-wheeling diode connected across the stator coil which becomes forward-biased during the half cycle of the counter-emf when the switch is open, thereby dissipating the stored inductive energy. However, the resulting current flow through the winding produces unacceptable negative torque.

SUMMARY OF THE INVENTION

In accordance with the present invention, there is provided an improvement in a brushless permanent magnet DC motor control system by which stored inductive energy within the stator is converted into useful motor mechanical energy while electrical energy not converted efficiently into useful motor mechanical energy is minimized.

In general, in accordance with an aspect of the present invention, there is provided in a brushless DC motor having a stator coil connected between a source of DC power voltage and circuit common and in which an alternating counter-emf exists, a circuit for converting stored inductive energy in said stator coil into useful motor mechanical energy, said circuit comprising:

a) first switch means connected in series between said stator coil and said circuit common for selectively switching current through said stator coil to circuit common during a positive torque producing half-cycle of said alternating counter-emf, thereby maintaining a predetermined average value of said current, and b) second switch means connected in series with a free-wheeling diode means across said stator coil for re-circulating said current through said stator coil when said first switch means is open and back-emf generated by said coil exceeds said counter-emf by an amount sufficient to forward-bias said diode means, whereby said current re-circulating through said stator coil results in positive torque while said first switch means is open.

In accordance with another aspect of the present invention, there is provided in a brushless DC motor having a stator coil connected between a source of DC power voltage and circuit common and in which an alternating counter-emf exists, a method of converting stored inductive energy in said stator coil into useful motor mechanical energy, comprising the steps of:

a) alternately switching current through said stator coil to said circuit common and blocking current from flowing through said coil to said circuit common during a positive torque producing half-cycle of said alternating counter-emf, thereby maintaining a predetermined average value of said current, and b) re-circulating said current through said stator coil during blocking of said current to said circuit common, whereby said current re-circulating through said stator coil results in positive torque.

In accordance with a further aspect of the present invention, there is provided in a brushless DC motor having a stator coil connected between a source of DC power voltage and circuit common and in which an alternating counter-emf exists, a control circuit for minimizing ohmic power loss in said stator coil, said circuit comprising:

a) switch means connected in series between said stator coil and said circuit common for alternately switching current through said stator coil to said circuit common and blocking current from flowing through said coil to said circuit common during a positive torque producing half-cycle of said alternating counter-emf, and b) means for delaying said switching of said current by a first predetermined amount relative to onset of said half-cycle and advancing said blocking of said current by a second predetermined amount relative to the end of said half-cycle, thereby reducing current flow surges and consequently ohmic power loss through said stator coil at each successive onset and end of said half-cycle when said torque produced is slow.

In accordance with an alternative embodiment of the present invention there is provided a brushless DC motor having a stator coil connected between a source of DC power voltage and circuit common and in which an alternating counter-emf exists, a method for minimizing ohmic power loss in said stator coil, said method comprising the steps of:

a) alternately switching current through said stator coil to said circuit common and blocking current from flowing through said coil to said circuit common during a positive torque producing half-cycle of said alternating counter-emf, and b) delaying said switching of said current by a first predetermined amount relative to onset of said half-cycle and advancing said blocking of said current by a second predetermined amount relative to the end of said half-cycle, thereby reducing current flow surges and consequently ohmic power loss through said stator coil at each successive onset and end of said half-cycle.

Thus, the control circuit of the present invention provides for increased efficiency of operation of a brushless permanent magnet motor by the conversion of stored electrical winding energy into useful mechanical energy.

In accordance with the aforementioned alternative embodiment, there is provided means of further increasing the efficiency by controlling the length and timing of the current pulses in the windings. By delaying the start of the current pulse and advancing its turn-off time, significant reduction in ohmic winding power loss in achieved, with only a minor reduction in average torque.

DESCRIPTION OF THE PREFERRED EMBODIMENTS

Figure 1A:
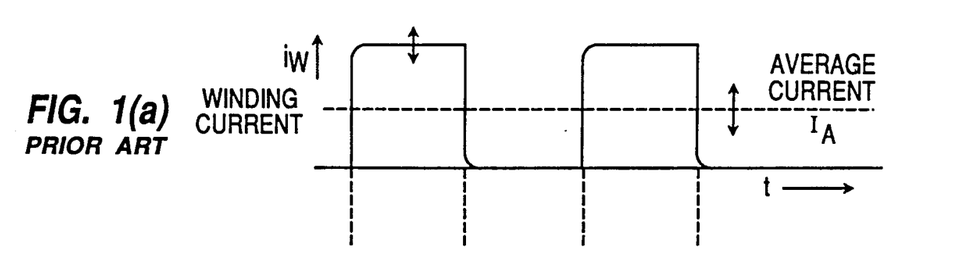
FIGS. 1(a)-(d) illustrate stator winding current waveforms according to prior art current control methods for known brushless permanent magnet DC motors.

Turning briefly to FIG. 1a, an amplitude control scheme is shown for maintaining a predetermined average current $I_A$ in the stator of a brushless DC motor. As discussed above, the winding current $i_W$ is permitted to flow only during one half cycle of the counter-emf within the stator coil. Thus, the average current $I_A$ may be controlled by varying the amplitude of the winding current $i_W$ flowing within the stator coil, in a very straightforward manner.

Figure 1B:
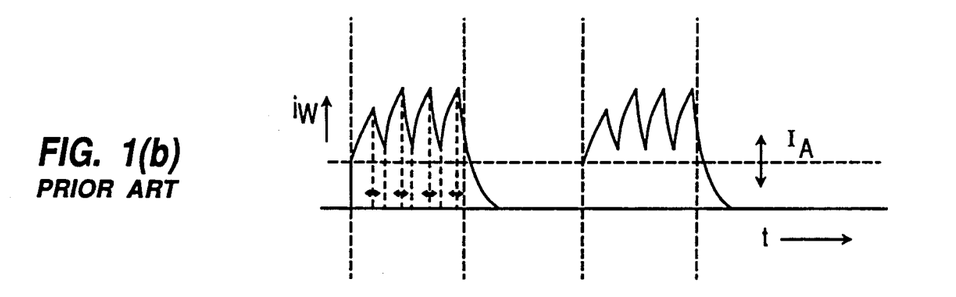
Figure 1C:
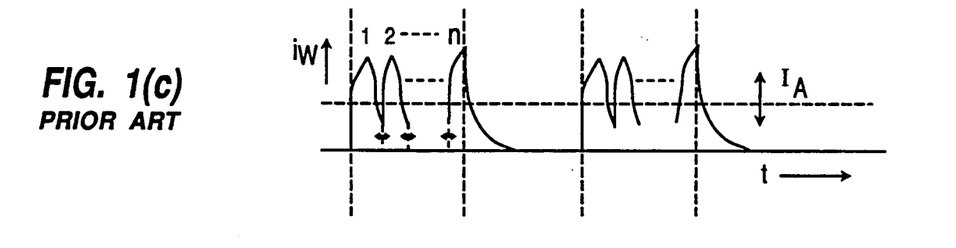
Figure 1D:
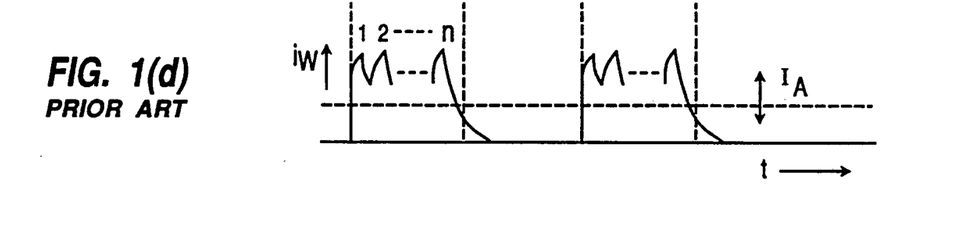

Turning to FIGS. 1b-1d, well known alternative time-ratio-control switching waveforms are shown for maintaining a predetermined average current $I_A$ in the stator coil. In particular, FIG. 1b shows a fixed pulse rate, variable pulse width control waveform; FIG. 1c illustrates a variable pulse rate, fixed pulse width waveform; and FIG. 1d illustrates fixed pulse rate, fixed pulse width and variable number of pulses per half cycle for effecting average current control within the stator windings.

Figure 2:
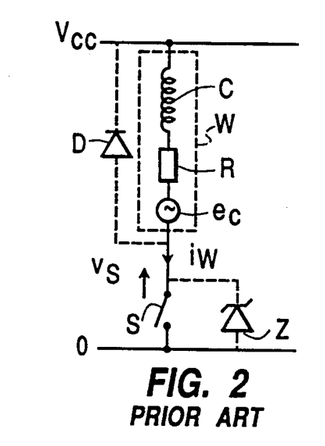
FIG. 2 illustrates a typical prior art current control for a coil winding of a permanent magnet DC motor.

Turning now to FIG. 2, a prior art control circuit is shown for dissipating stored inductive energy generated within the stator winding W of a DC motor. The stator winding W is schematically modelled by an inductor coil C connected in series to a resistor R and alternating current source of counter-emf ($e_C$). The stator coil W is connected between a source of DC power voltage $V_{CC}$ and circuit common (i.e. 0 volts) by means of a switch S. The stored inductive energy generated by stator coil W when switch S is opened to prevent current flow during the other half cycle, may be absorbed in the switch or by means of an over-voltage device such as Zener diode Z connected in parallel to the switch S.

According to the prior art circuit of FIG. 2, a free-wheeling diode D is connected in parallel with the stator coil W for dissipating the decaying stator winding current $i_W$ when the switch S opens. More particularly, as a result of the counter-emf $e_c$ in the winding W, the diode D becomes forward-biased during the half cycle of the counter-emf when switch S is open, and the resulting winding current produces unacceptable negative torque, as discussed above.

By way of contrast, in accordance with the present invention, a free-wheeling diode is employed in a half-wave configuration without the consequence of negative torque, so that a more efficient operation is achieved under time-ratio-control of speed, acceleration, deceleration and inrush current and also at high motor speeds for which high switching rates are required.

Figure 4:
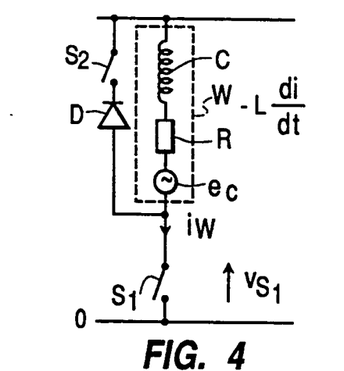
FIG. 4 illustrates a control circuit provided in accordance with the present invention.
Figure 5:
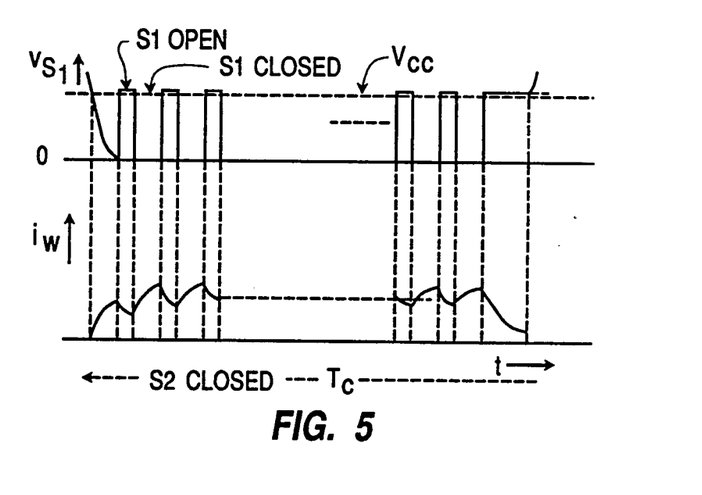
FIG. 5 illustrates the voltage and current waveforms for the circuit of FIG. 4.

The present invention is illustrated broadly by the circuit of FIG. 4 and waveforms of FIG. 5. In a single switch winding configuration operated with time-ratio-control, an additional switch $S_2$ is connected in series with free-wheeling diode D across the winding W. The switched diode D may be instead, a transistor, thyristor or other suitable circuitry for performing the desired function.

The switch $S_2$ is maintained open when the polarity of the counter-emf is such as to forward bias the diode D, and closed when the winding W carries current (i.e. in the interval $T_C$) when the counter-emf is of opposite polarity (FIG. 5).

Current flows in the winding W during the interval $T_C$ as switch $S_1$ is opened and closed under time-ratio-control. Each time switch $S_1$ opens, the back-emf (i.e. $-Ldi/dt$) generated in winding W builds up until it exceeds the counter-emf $e_C$ and, being of opposite polarity, causes diode D to conduct through switch $S_2$. The winding, therefore, continues to carry significant but decaying current when switch $S_1$ is open, as depicted in FIG. 5, which contributes positive rotor torque.

Thus, according to the present invention, most of the stored inductive energy is converted into useful mechanical energy, instead of being dissipated in the switch $S_1$ or any voltage-protective device connected across it, as in the prior art.

Figure 6:
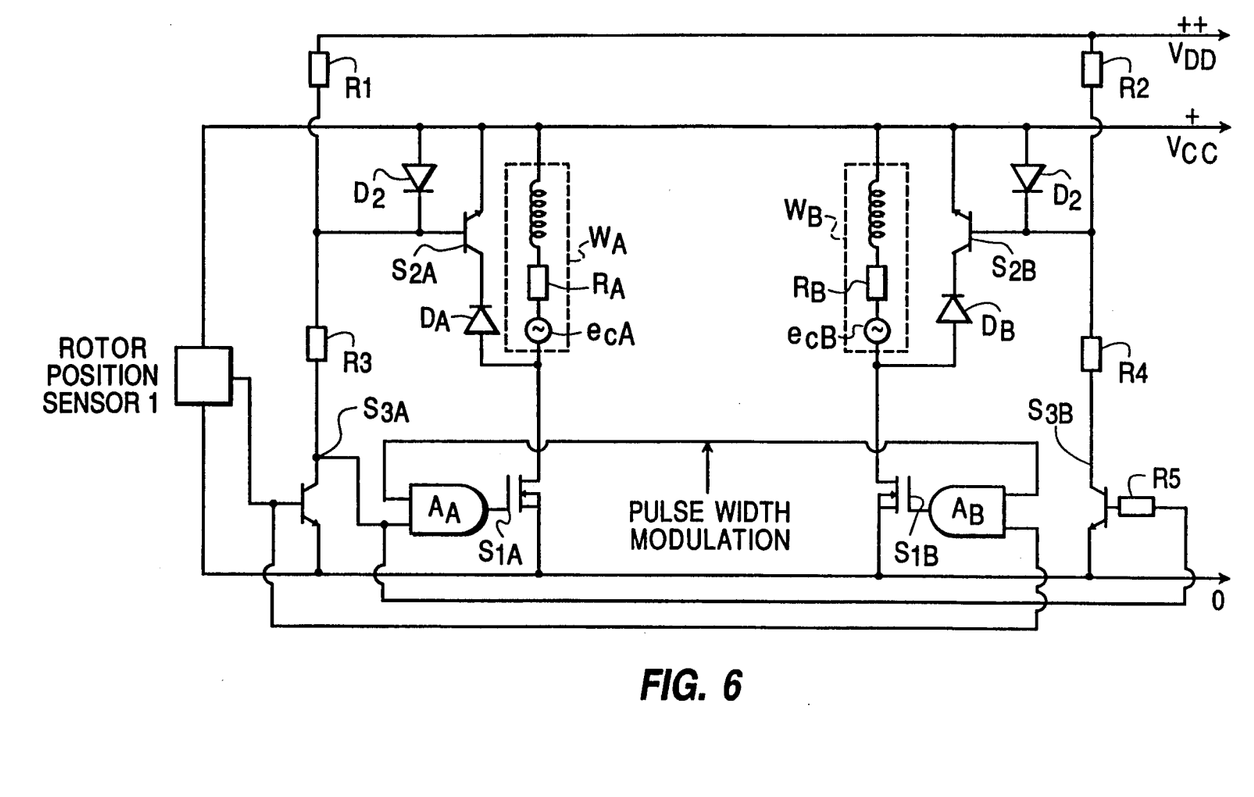
FIG. 6 illustrates one embodiment of application of the circuit of the present invention to a single phase two-alternate winding DC motor.

An example of a circuit embodying this invention is shown in FIG. 6. $W_A$ and $W_B$ are alternate windings in one phase of a DC brushless motor carrying current pulses shaped by switching signals applied to switches $S_{1A}$ and $S_{1B}$. The switching signal at $S_{1A}$ consists of pulses from a rotor position sensor 1 in synchronism with the counter-emf $e_{cA}$ in winding $W_A$, logically ANDed with a pulse-width-modulated signal in logic circuit $A_A$. The rotor position sensor signal also operates switch $S_{2A}$ which is, therefore, also in synchronism with the counter-emf $e_{cA}$.

Switch $S_{2A}$ is closed during the half-cycle of the counter-emf $e_{CA}$ when pulse-width-modulated current is required to flow in winding $W_A$, due to the voltage on its base being positive with respect to the $V_{CC}$ bus, which occurs when switch $S_{3A}$ is open, the $V_{DD}$ bus being more positive than the $V_{CC}$ bus. Thus, during the half-cycle of the counter-emf $e_{cA}$, diode $D_A$ is reverse-biased when switch $S_{1A}$ is closed, and is forward-biased when switch $S_{1A}$ is open, due to the back-emf in the winding. Current in winding $W_A$ therefore, can continue to flow via diode $D_A$ and switch $S_{2A}$ each short time that the switch $S_{1A}$ is open, contributing positive torque.

It should be noted that switch $S_{1A}$, even if it is self-protected against over-voltage by an internal avalanche characteristic, receives none of the winding energy released because the drain-to-source voltage is effectively clamped by the diode $D_A$ to the bus voltage $V_{cc}$. Thus, the current carrying capacity of the switch $S_{1A}$ is not thereby reduced. If it is not so protected, no external over-voltage protective device is necessary.

According to the preferred embodiment, switches $S_{1A}$ and $S_{2A}$ are in the form of n-channel IGFETs, and switches $S_{2A}$, $S_{2B}$, $S_{3A}$ and $S_{3B}$ are in the form of bipolar n-p-n transistors. However, it will be understood that various other suitable electronic switching devices may be used to accomplish the same function. Furthermore, various biasing and current limiting resistors $R_1$–$R_2$ and diodes $D_1$–$D_2$ are connected in a well known manner.

The above description of operation of winding $W_A$ applies equally to winding $W_B$ and its associated control components. Identical circuits also can be used to control multi-phase motors.

The invention has been described for operation with time-ratio-control. The invention also offers benefit for motors operating without this method of control, but at high speed where high switching rates are encountered.

In summary, this circuit of the present invention permits switched winding energy to be converted into useful rotor mechanical energy by employing switched diodes.

Figure 3:
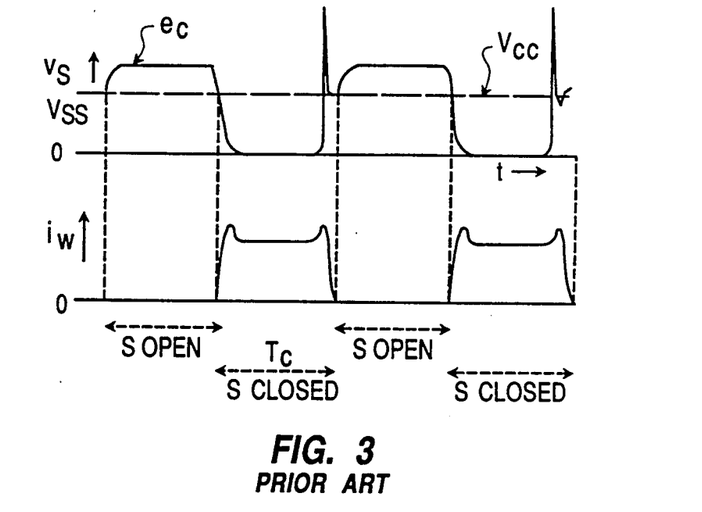
FIG. 3 illustrates the voltage and current waveforms for the circuit of FIG. 2.

As discussed above, in the prior art circuits of FIGS. 2 and 3, positive torque is only obtained by confining the current in the winding W to the half-cycles of the counter-emf in which the polarity of the counter-emf opposes the flow of current caused by the bus voltage $V_{cc}$ imposed across the winding.

It is advantageous to delay the start of current beyond the instant that the counter-emf reverses polarity, and to turn it off before the counter-emf again reverses, as is achieved in accordance with the alternative embodiment of the present invention. By doing so, there regions in the half-cycle can be minimized where (a) the current is high and the winding ohmic power loss consequently high and (b) the torque is low because the component of magnetic field at the torque-producing legs of the winding is low. In this way, an increase in efficiency can be realized at the expense of a minor reduction in average torque.

Figure 7:
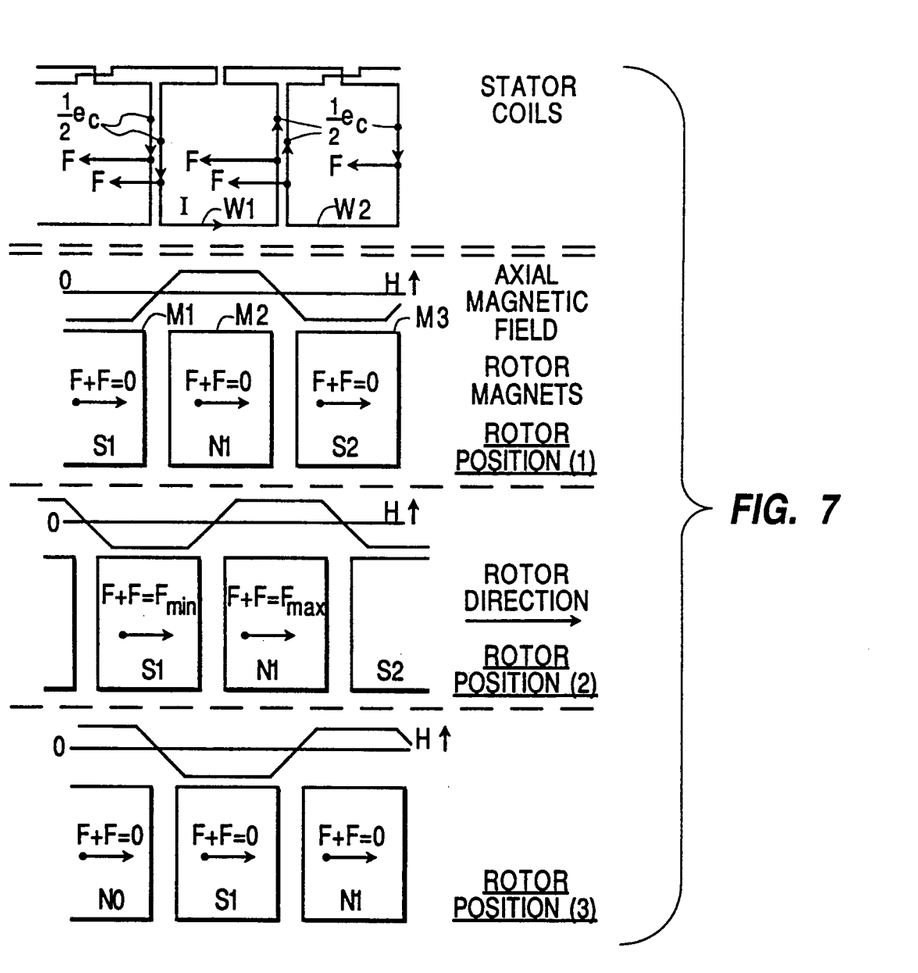
FIG. 7 illustrates the spacial relationship between two adjacent coils of the stator winding and three magnets on the rotor of a brushless DC motor in three successive positions.

In FIG. 7, there is shown the spatial relationship between:

(a) two adjacent coils of the stator winding $W_1$ and $W_2$, each carrying current I, induced counter-emf $e_c$ and experiencing a force $-(F+F)$, and (b) three magnets M1–M3 on the rotor, each experiencing a force $+(F+F)$ which produces shaft torque.

The following description applies to a winding-magnet configuration in which the magnetic field is parallel to the shaft axis and the winding plane is perpendicular to it. The invention applies equally to motors with other winding magnet angular relationships to the shaft axis. Referring to the drawings:

Rotor Position (1) corresponds to the alignment of the radial legs of the windings W1 and W2 with the gaps between the magnets where the axial torque-producing component of the magnetic field is zero. Hence the forces on the magnets M1–M3 for Rotor Position (1) are zero.

Rotor Position (2) shows, 90 electrical degrees later, the alignment of the centers of the magnets, M1–M3, where the axial component of the magnetic field is a maximum, with the radial legs of the windings W1 and W2. Hence, the forces on the magnets for Rotor Position (2) are a maximum.

Rotor Position (3) is 90 electrical degrees later than Rotor Position (2) and the counter-emf is again zero and the forces on the magnets M1–M3 are also zero.

Figure 8:
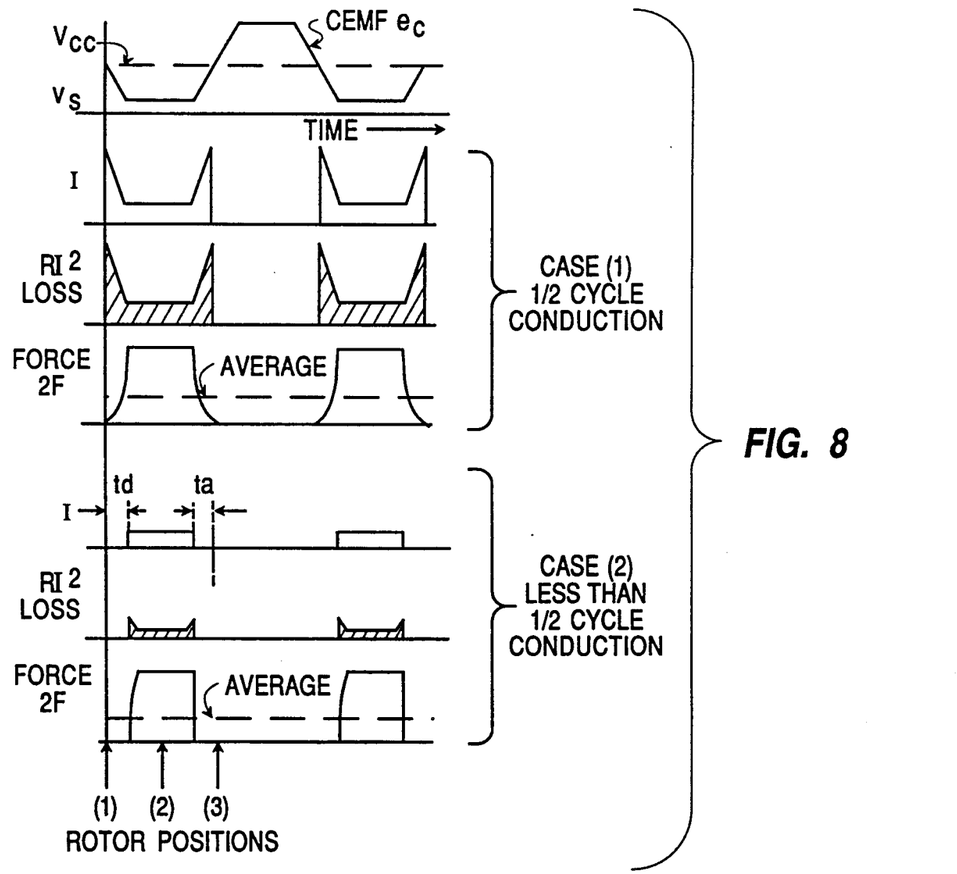
FIG. 8 shows the counter-emf, winding current, winding ohmic power loss and magnet forces in the time domain for the spacial relationship of FIG. 7.

FIG. 8 relates the counter-emf, winding current, winding ohmic power loss and magnet forces in the time domain for the rotor positions shown in FIG. 7. The two cases shown are (1) for a half-cycle current pulse length, and (2) for a current pulse of less than half-cycle with delayed turn-on and advanced turn-off (i.e., in accordance with the invention).

CASE 1

At the instant of Rotor Position (1), the counter-emf $e_c$ is zero, current is switched on and the current rises to a maximum of $V_{cc}/R$ and winding power loss to $V_{cc}^2/R$. The force 2F experienced by each magnet M1–M3 is zero because the axial component of the magnetic field at the radial legs is zero. At the instant of Rotor Position (2), the counter-emf $e_c$ is a maximum and the current falls to $(V_{cc}-e_c)/R$ and winding power loss to $(V_{cc}-e_c)^2/R$ which is $<<V_{cc}^2/R$. Forces 2F are a maximum because the axial component of magnetic field at the radial legs is a maximum.

At the instant of Rotor Position (3), the conditions for Rotor Position (1) are repeated.

CASE 2

The start of the current is delayed by time interval $t_d$ and the turn-off is advanced by time interval $t_a$, thus reducing the winding ohmic power loss at each end of the half-cycle, without greatly reducing the average torque in the half-cycle.

In this way, decreasing the current pulse length and controlling its timing with respect to the counter-emf, a significant reduction in winding power loss is achieved and the efficiency of the motor is increased. Since there is no sudden transition in efficiency as $t_d$ and $t_a$ are varied, a further advantage of the pulse length and timing control feature of the invention is the ability to lengthen the pulse, if greater average torque is temporarily desired, while accepting the reduced efficiency. Likewise, if less average torque is called for in order, for example to reduce speed, the pulse can be shortened.

Figure 9:
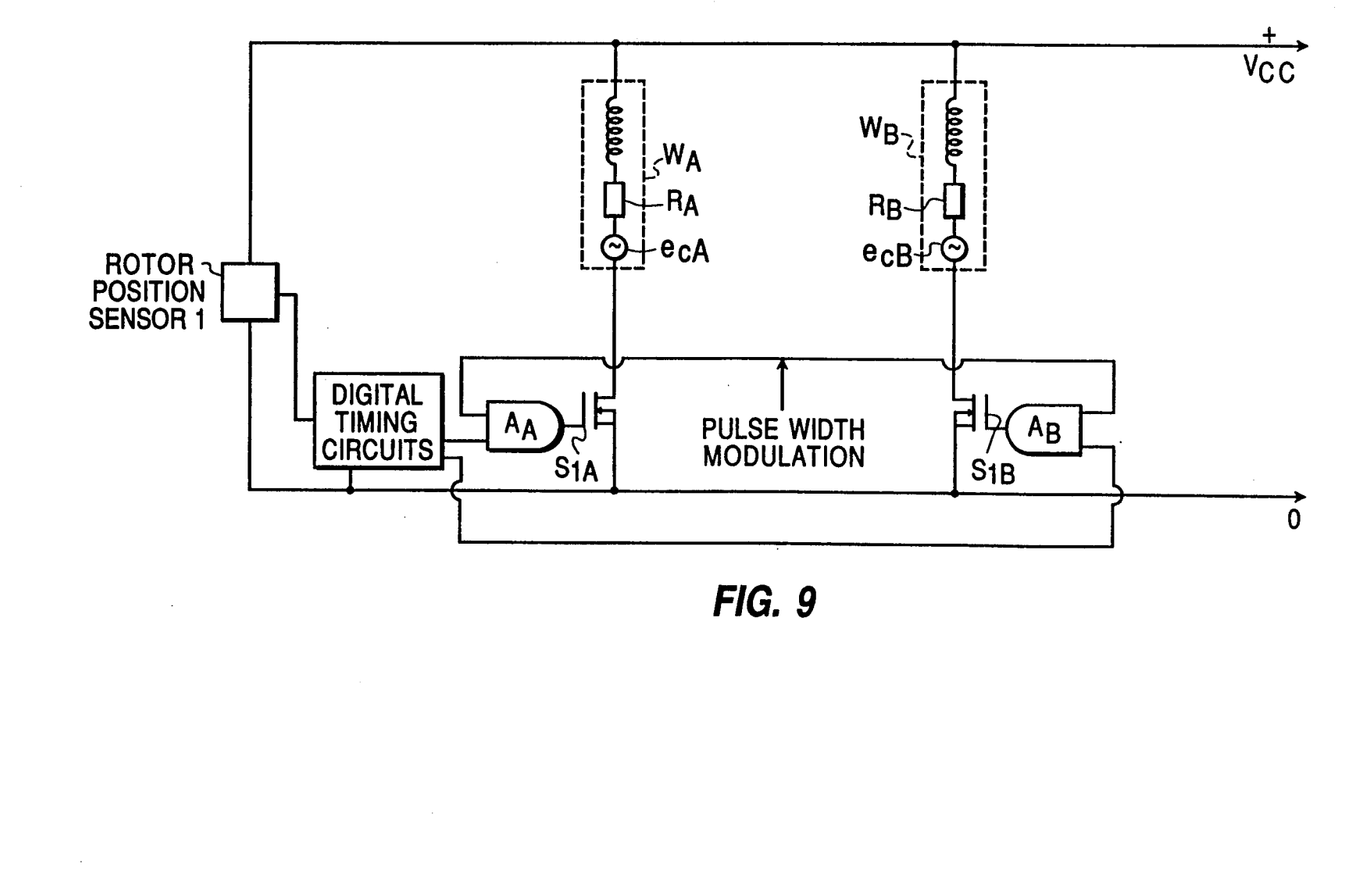
FIG. 9 is a schematic circuit diagram of a circuit for controlling current pulse length and timing in accordance with the alternative embodiment of the present invention.

FIG. 9 illustrates a control circuit in accordance with the alternative embodiment of the present invention for varying pulse length and timing in synchronization with the position of the rotor. As discussed above with reference to FIG. 6, $W_A$ and WB are alternate windings in one phase of a DC brushless motor carrying current pulses shaped by switching signals applied to switches $S_{1A}$ and $S_{1B}$. The switching signal at $S_{1A}$ consists of pulses from rotor position sensor 1 modified by digital timing circuit 3 in substantial synchronism with the counter-emf $e_{ca}$ in winding $W_A$, logically ANDed with a pulse width modulated signal in logic circuit $A_A$.

The digital timing circuit 3 functions to delay closing of the switch $S_{1A}$ by time interval $t_d$ and advancing the opening of the switch $S_{1A}$ by a time interval $t_a$ relative to the rotor position sensor signal output from sensor 1, resulting in reduced winding power loss and increased efficiency, as depicted in the waveform diagrams of FIG. 8, (case 2).

The functions of digital timing circuit 3 can also be provided by discrete circuit components, or by a microcontroller i.e., a microcomputer, in a well known manner.

The above description of operation of winding $W_A$ applies equally to winding $W_B$ and its associated control components. Identical circuits can also be used to control multi-phase motors.

The embodiment of FIG. 9 has been described for operation without time-ratio-control, but may be easily modified to operate with this method of control.

Furthermore, the current pulse length and timing control is described herein as applied to a half-wave winding configuration, but is equally applicable to a full-wave configuration.

In summary, the present invention provides an improvement in circuit control for converting switched winding energy into useful rotor mechanical energy, as well as to achieve a significant decrease in ohmic winding power loss with only a minor decrease in average torque. Modifications are possible within the scope of this invention as defined in the claims appended hereto.

The embodiments of the invention in which an exclusive property or privilege is claimed are defined as follows:

1. In a brushless DC motor having a stator coil connected between a source of DC power voltage and circuit common and in which an alternating counter-emf exists, a circuit for converting stored inductive energy in said stator coil into useful motor mechanical energy, said circuit comprising:
   a) first switch means connected in series between said stator coil and said circuit common for selectively switching current through said stator coil to circuit common during a positive torque producing half-cycle of said alternating counter-emf, thereby maintaining a predetermined average value of said current,
   b) second switch means connected in series with a free-wheeling diode means across said stator coil for re-circulating said current through said stator coil when said first switch means is open and back-emf generated by said coil exceeds said counter-emf by an amount sufficient to forward-bias said diode means, whereby said current re-circulating through said stator coil results in positive torque while said first switch means is open,
   c) rotor position sensor means for generating a first plurality of control pulses for controlling operation of said second switch means responsive to positioning of a rotor of said DC motor, said control pulses being in synchronism with said alternating counter-emf,
   d) a pulse modulation circuit for generating a second plurality of control pulses, and
   e) a logic circuit for receiving said first and second plurality of control pulses and in response controlling operation of said first switch means in synchronism with said counter-emf.

2. The circuit of claim 1 wherein said first switch means is an n-channel depletion IGFET having a drain terminal connected to said stator coil, a source terminal connected to said circuit common, and a gate terminal connected to an output of said logic circuit.

3. The circuit of claim 1 wherein an anode of said diode means is connected to said stator coil and a cathode of said diode means is connected to said second switch means, and wherein said second switch means is a bipolar transistor having an emitter terminal connected to said source of DC power voltage, a collector terminal connected to said cathode, and a base terminal connected to said rotor position sensor means.

4. The circuit of claim 1 wherein said logic circuit is an AND gate.

5. The circuit of claim 1 wherein said pulse modulation circuit comprises a pulse width modulator for selectively controlling a width of pulses of said current through said stator coil and thereby maintaining said predetermined average value of said current.

6. The circuit of claim 1 wherein said pulse modulation circuit comprises a pulse rate modulator for selectively controlling a rate of pulses of said current through said stator coil and thereby maintaining said predetermined average value of said current.

7. The circuit of claim 1 wherein said pulse modulation circuit comprises circuitry for selectively controlling a number of pulses of said current through said stator coil during said positive torque producing half cycle and thereby maintaining said predetermined average value of said current.

8. The circuit of claim 1, wherein said switch means comprises transistors.

9. In a brushless DC motor having a stator coil connected between a source of DC power voltage and circuit common and in which an alternating counter-emf exists, a control circuit for minimizing ohmic power loss in said stator coil, said circuit comprising:
   a) switch means connected in series between said stator coil and said circuit common for alternately switching current through said stator coil to circuit common and blocking current from flowing through said coil to said circuit common during a positive torque producing half-cycle of said alternating counter-emf,
   b) means for delaying said switching of said current by a first independently variable predetermined amount relative to onset of said half-cycle and advancing said blocking of said current by a second independently variable predetermined amount relative to the end of said half-cycle, thereby reducing current flow surges and consequently ohmic power loss through said stator coil at each successive onset and end of said half-cycle when said torque produced is low,
   c) rotor position sensor means for generating a first plurality of control pulses responsive to positioning of a rotor of said DC motor, said control pulses being in synchronism with said alternating counter-emf, d) a digital timing circuit for receiving said first plurality of control pulses and in response generating a second plurality of timing control pulses, e) a pulse modulation circuit for generating a third plurality of control pulses, and f) a logic circuit for receiving said second and third plurality of control pulses and in response controlling operation of said switch means in substantial synchronism with said counter-emf but with said switching and said blocking of said current delayed and advanced, respectively, by said first and second respective predetermined amounts.

10. The circuit of claim 9 wherein said switch means is an n-channel depletion IGFET having a drain terminal connected to said stator coil, a source terminal connected to said circuit common, and a gate terminal connected to an output of said logic circuit.

11. The circuit of claim 9 wherein said logic circuit is an AND gate.

12. The circuit of claim 9 wherein said pulse modulation circuit comprises a pulse width modulator for selectively controlling the width of pulses of said current through said stator coil and thereby maintaining a predetermined average value of said current.

13. The circuit of claim 9 wherein said pulse modulation circuit comprises a pulse rate modulator for selectively controlling the rate of pulses of said current through said stator coil and thereby maintaining a predetermined average value of said current.

14. The circuit of claim 9 wherein said pulse modulation circuit comprises circuitry for selectively controlling the number of pulses of said current through said stator coil during said positive torque producing half cycle and thereby maintaining a predetermined average value of said current.

15. The circuit of claim 9 wherein said digital timing circuit comprises a microcontroller.

16. In a brushless DC motor having a stator coil connected between a source of DC power voltage and circuit common and in which an alternating counter-emf exists, a control circuit for minimizing ohmic power loss in said stator coil, said circuit comprising:

a) switch means connected in series between said stator coil and said circuit common for alternately switching current through said stator coil to said circuit common and blocking current from flowing through said coil to said circuit common during a positive torque producing half-cycle of said alternating counter-emf, and b) means for delaying said switching of said current by a first independently variable predetermined amount relative to onset of said half-cycle and advancing said blocking of said current by a second independently variable predetermined amount relative to the end of said half-cycle, thereby reducing current flow surges and consequently ohmic power loss through said stator coil at each successive onset and end of said half-cycle when said torque produced is low, and said means for delaying comprising a digital timing circuit.

17. The circuit of claim 16 wherein said digital timing circuit comprises a microcontroller.

18. In a brushless DC motor having a stator coil connected between a source of DC power voltage and circuit common and in which an alternating counter-emf exists, a control circuit for minimizing ohmic power loss in said stator coil, said circuit comprising:

a) switch means connected in series between said stator coil and said circuit common for alternately switching current through said stator coil to said circuit common and blocking current from flowing through said coil to said circuit common during a positive torque producing half-cycle of said alternating counter-emf, b) means for delaying said switching of said current by a first predetermined amount relative to onset of said half-cycle and advancing said blocking of said current by a second predetermined amount relative to the end of said half-cycle, thereby reducing current flow surges and consequently ohmic power loss through said stator coil at each successive onset and end of said half-cycle when said torque produced is low, c) rotor position sensor means for generating a first plurality of control pulses responsive to positioning of a rotor of said DC motor, said control pulses being in synchronism with said alternating counter-emf, d) a digital timing circuit for receiving said first plurality of control pulses and in response generating a second plurality of timing control pulses, e) a pulse modulation circuit for generating a third plurality of control pulses, and f) a logic circuit for receiving said second and third plurality of control pulses and in response controlling operation of said switch means in substantial synchronism with said counter-emf but with said switching and said blocking of said current delayed and advanced, respectively, by said first and second respective predetermined amounts.

19. The circuit of claim 18 wherein said switch means is an n-channel depletion IGFET having a drain terminal connected to said stator coil, a source terminal connected to said circuit common, and a gate terminal connected to an output of said logic circuit.

20. The circuit of claim 18 wherein said logic circuit is an AND gate.

21. The circuit of claim 18 wherein said pulse modulation circuit comprises a pulse width modulator for selectively controlling a width of pulses of said current through said stator coil and thereby maintaining a predetermined average value of said current.

22. The circuit of claim 18 wherein said pulse modulation circuit comprises a pulse rate modulator for selectively controlling a rate of pulses of said current through said stator coil and thereby maintaining a predetermined average value of said current.

23. The circuit of claim 18 wherein said pulse modulation circuit comprises circuitry for selectively controlling a number of pulses of said current through said stator coil during said positive torque producing half cycle and thereby maintaining a predetermined average value of said current.

24. The circuit of claim 18 wherein said digital timing circuit comprises a microcontroller.

* * * * *